(12) United States Patent
Delalande

(10) Patent No.: US 7,524,189 B2
(45) Date of Patent: Apr. 28, 2009

(54) FREE FALL SIMULATOR

(75) Inventor: Emmanuel Moinel Delalande, Paris (FR)

(73) Assignee: Profit of Immonel, Paris (FR)

( * ) Notice: Subject to any disclaimer, the term of this patent is extended or adjusted under 35 U.S.C. 154(b) by 689 days.

(21) Appl. No.: 10/526,356

(22) PCT Filed: Sep. 4, 2003

(86) PCT No.: PCT/FR03/02645

§ 371 (c)(1),
(2), (4) Date: Nov. 30, 2005

(87) PCT Pub. No.: WO2004/022427

PCT Pub. Date: Mar. 18, 2004

(65) Prior Publication Data

US 2006/0105300 A1    May 18, 2006

(30) Foreign Application Priority Data

Sep. 4, 2002   (FR) .................................. 02 10916

(51) Int. Cl.
*G09B 19/16* (2006.01)
(52) U.S. Cl. ..................................................... 434/59
(58) Field of Classification Search .................. 434/29, 434/30, 48, 49, 53, 54, 59; 273/49, 130, 273/137; 472/49, 50, 134, 136, 137
See application file for complete search history.

(56) References Cited

U.S. PATENT DOCUMENTS

| | | | | |
|---|---|---|---|---|
| 3,484,953 A | * | 12/1969 | Norheim, Jr. ................ 434/258 |
| 4,457,509 A | * | 7/1984 | St-Germain .................. 472/136 |
| 4,535,983 A | * | 8/1985 | De-La-Concha-Caceres ..... 472/137 |
| 4,578,037 A | * | 3/1986 | Macangus et al. ............ 434/258 |
| 5,209,702 A | * | 5/1993 | Arenas ........................ 472/136 |
| 5,593,352 A | * | 1/1997 | Methfessel et al. ............. 472/50 |
| 5,655,909 A | * | 8/1997 | Kitchen et al. ................. 434/44 |
| 6,083,110 A | * | 7/2000 | Kitchen et al. ................. 472/49 |
| 6,139,439 A | * | 10/2000 | Ure ............................. 472/136 |
| 6,315,672 B1 | | 11/2001 | Godichon et al. |
| 7,153,136 B2 | * | 12/2006 | Hatlestad et al. .............. 434/59 |

FOREIGN PATENT DOCUMENTS

| | | |
|---|---|---|
| FR | 2 659 620 A | 9/1991 |
| GB | 2 062 557 A | 5/1981 |
| GB | 2 094 162 A | 9/1982 |

* cited by examiner

*Primary Examiner*—Kurt Fernstrom
(74) *Attorney, Agent, or Firm*—Foley & Lardner LLP

(57) ABSTRACT

The invention concerns a free fall simulator, characterized in that it comprises: a lower compression chamber (22) proximate the lower periphery wherefrom emerge the outputs of a plurality of ventilators (24) arranged in centripetal configuration, and the tapered upper part of which is arranged a compression grid (30), a cylindroid chamber (36) defining a displacement space, which is located just above the compression chamber (22), and which is designed to be traversed by a homogeneous rising air stream having a gradient of constantly decreasing upward speeds.

12 Claims, 1 Drawing Sheet

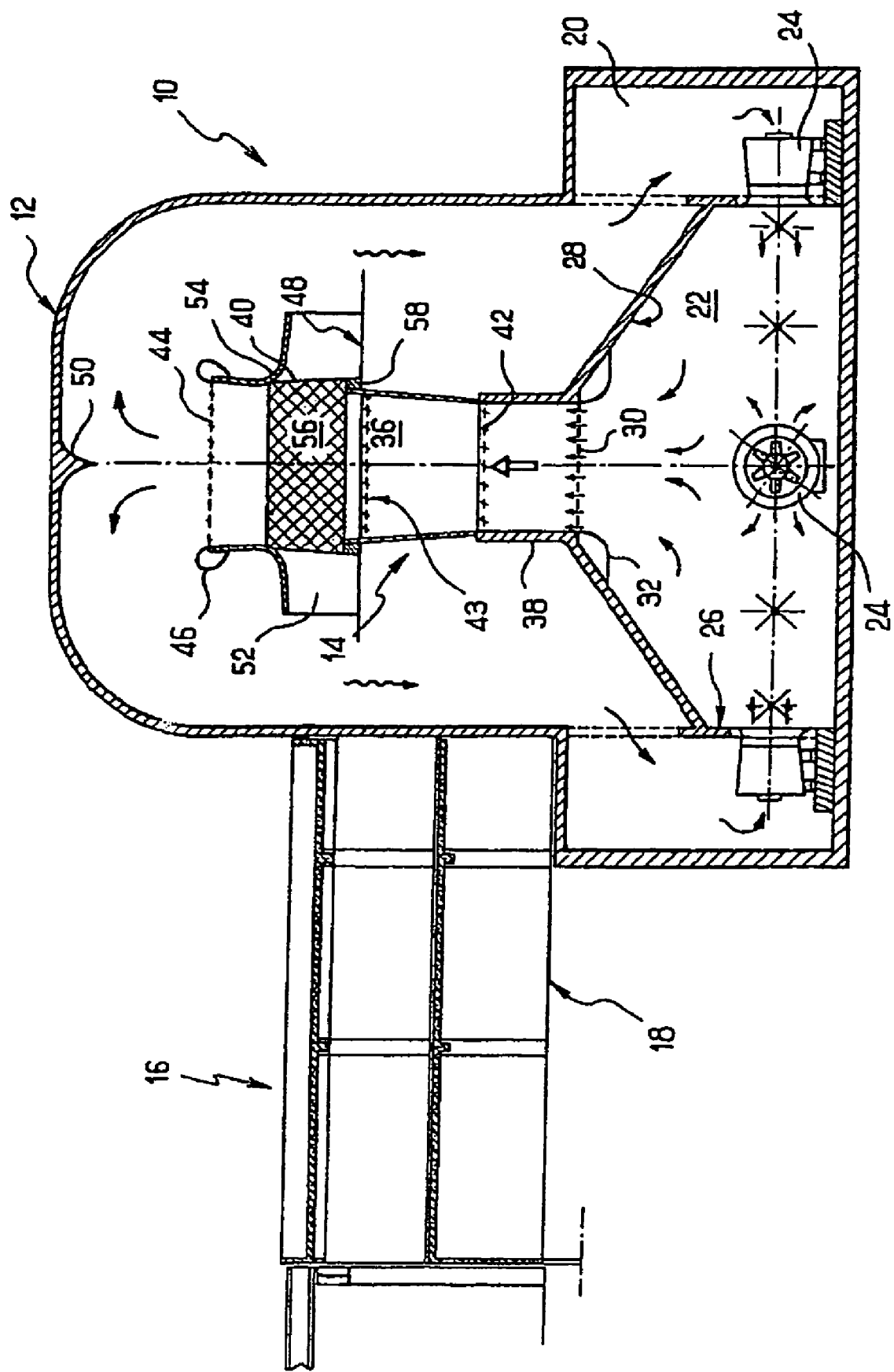

FREE FALL SIMULATOR

The present invention relates to a free fall simulator, in other words an installation for keeping a person in equilibrium in a free fall position in a controlled flow of rising air which passes through a maneuvering chamber.

A free fall simulator of this type has been designed for multiple purposes, including training and education of parachutists or sports enthusiasts, and has even been applied in theme parks. Clearly, this type of free fall simulator makes it possible to avoid all the problems of cost and meteorological uncertainties associated with the obligation regarding normal practice when diving from an aircraft at altitude.

The object of the present invention was therefore to provide an improved free fall simulator which is capable of generating a rising air flow at decreasing speed. Such an air flow has to be as homogeneous as possible to enable any user, regardless of his weight and build, to move through his equilibrium positions and free fall configurations at different equilibrium heights. To enable the user to learn effectively how to change the attitude and orientation of his body to control the speed and direction of motion of his fall, it is essential to generate a rising air flow which is as homogeneous as possible within the maneuvering chamber. Such an installation must of course also meet a number of other constraints relating to environmental protection, and more particularly relating to sound-proofing.

SUMMARY OF THE INVENTION

This is why the present invention relates to a free fall simulator which is characterized in that it comprises:
  a lower compression chamber:
    in the vicinity of whose lower periphery there open the outlets of a plurality of fans arranged in a centripetal configuration, and
    in whose upper tapered part there is placed a compression grid;
  a cylindroid chamber delimiting a maneuvering space, which is located immediately above the compression chamber, and which is designed to be traversed by a homogenous flow of rising air having a speed gradient decreasing regularly from the bottom to the top; and
  a generally cylindrical superstructure which encloses at least the maneuvering chamber of the simulator, which terminates in its upper part in a dome covering said maneuvering chamber of the simulator, and which is arranged to promote a downward circulation of the air leaving the maneuvering chamber toward the fan inlets.

According to the present invention, the inner surface of the compression chamber must be shaped to generate a homogeneous air flow which is essential to ensure the stability of the operator in the maneuvering chamber.

A certain number of specific characteristics relating to the design of this compression chamber will become clear from reading the detailed description provided below, particularly with reference to the attached drawings showing schematically a free fall simulation installation of this type.

Further characteristics relating to the maneuvering chamber of the simulator will also become clear from reading the following detailed description.

BRIEF DESCRIPTION OF THE DRAWING

The FIGURE shows a free fall simulator according to one embodiment of the invention.

DETAILED DESCRIPTION OF THE INVENTION

The free fall simulation installation according to the invention comprises a superstructure part 10 comprising a dome 12 protecting the maneuvering cylinder itself 14.

In the attached drawing, the superstructure part is extended by a schematic representation of attached buildings 16 designed to house changing rooms, sanitary facilities and access corridors for the maneuvering chamber 14, an extension which can be provided equally well on either side of the dome 10. In the attached drawing, the line 18 indicates schematically the approximate ground level.

Below this level 18, the installation comprises an substructure part essentially consisting of an annular machine room 20 for the introduction of air, together with the lower compression chamber 22.

The lower compression chamber 22 has in the vicinity of its lower periphery a plurality of apertures into which there open the outlets of centrifugal fans 24 arranged in a centripetal configuration. This lower part of the compression chamber 22 is advantageously made in the general shape of a cylindrical solid of revolution 26 extended upward by a truncated conical part 28.

To generate a homogenous air flow both in the compression chamber 22 and especially in the maneuvering chamber 14 subsequently, it is advantageous to arrange the propeller fans 24 with a constant angular spacing.

In practice, it has been found satisfactory to use twelve centrifugal fans installed in the annular machine room 20 with a constant angular spacing.

In the illustrated embodiment, the compression chamber 22 has a radius of 7.75 m and a height of 7.5 m. The shape of this chamber makes it possible, in particular, to generate air speed curves which are as homogeneous as possible.

In order to avoid the separation of the air stream along the inner wall of the truncated conical part 28 near the compression grid 30 arranged in the upper tapered part of the truncated conical part 28, it was found useful to equip the inner wall with an annular bend 32 projecting toward the inside of the compression chamber 22. In the illustrated embodiment, the annular bend has a radius of 1 m. This characteristic profile of the inner wall of the compression chamber 22 makes it possible to channel the air flow and to efficiently convert the static pressure of the chamber to dynamic pressure without causing the separation of the air stream after its passage through the annular bend 32. This bend has a radius of approximately 1 m and is preferably made in the form of a galvanized sheet steel component which is perfectly matched to the structure of the concrete walls of the lower compression chamber.

The fans placed in the room can consist of centrifugal fans of the type having an inlet funnel protected with a grid, for introducing air which travels through apertures formed in the periphery of the annular machine room 20. In the conditions of embodiment of the illustrated installation, the air flow speed in this annular section and at the fan inlet will preferably remain less than 7 m/s.

The propeller fans will advantageously be mounted on pedestals and anti-vibration blocks. The characteristics of the fans which have been used successfully in practice can be, for example, as follows:
unit air flow rate: 66 m$^3$/s;
fan pressure: 2,260 Pa.

The air outflow speed from this type of fan should advantageously be in the vicinity of 40 m/s.

The compression grid 30 fitted after the annular bend 32 has the principal function of maintaining the pressure of the lower compression chamber 22 and distributing as uniformly as possible the air speeds at the outlet of this compression chamber.

Advantageously, the compression grid 30 which is mounted in the upper part of the lower compression chamber 22 is designed to generate a pressure drop of approximately 150 Pa. In practice, a grid having a mesh size of 500 mm×500 mm and, for example, a wire diameter of approximately 2 mm has been found entirely satisfactory.

To complete the description of the lower substructure part of the installation according to the invention, we should mention that there must be constant air renewal 24, principally in order to counteract the overheating of the air due to the operation of the fans and to supply clean air regularly. For this purpose, in a particular embodiment, the upper part of the dome 12 has at least one fresh air intake fitted with a sound trap. Furthermore, air extraction is provided mechanically by a plurality of extractor fans which also enable the temperature of the whole flight simulator to be controlled.

Sound traps can advantageously also be provided at the outlets of the extractor fans.

In all circumstances, fresh air inlets and outlets should be provided in this installation and should be arranged for operation in opposition.

The compression grid 30 is surmounted by a cylindroid chamber 36 delimiting a maneuvering space, located immediately above the compression chamber 22. This cylindroid chamber 36 is designed to be traversed by a homogeneous rising air flow having a speed gradient decreasing regularly from the bottom to the top.

Advantageously, this cylindroid maneuvering chamber 36 comprises a generally cylindrical bottom part 38 which is extended upward by a diverging conical part 40.

Advantageously, the angle formed by the walls of the diverging conical part 40 with the vertical is less than approximately 6°.

In the embodiment schematically shown, the total maneuvering height is of the order of 7 m. This total maneuvering height extends between the two safety nets 42 and 44 fitted, respectively, to the bottom and top parts of the cylindroid maneuvering chamber 36, when the intermediate comfort net 43 is removed.

The bottom part of this cylindroid maneuvering chamber 36 consists, in the installation shown in the attached FIGURE, of a cylinder 3.80 m in diameter with a height of 2 m. The diverging conical part 40 has a height of 8.50 m with an angle of divergence from the vertical of approximately 3.6°. in practice, this angle has made it possible to avoid the wall effects and the separation of the air stream along the cylindroid maneuvering chamber 36.

It will be noted that, in these conditions, the bottom safety net 42, fitted approximately 1.5 m from the compression grid 30 and above the latter, contributes to a total pressure drop for the compression grid and safety net of the order of 400 Pa.

Users of the installation can therefore maneuver through a height of approximately 7 m between the bottom protective net 42 and the lift limit located approximately 50 cm below the upper protective net 44.

In order to facilitate the outflow of air at the outlet of the cylindroid chamber 36 and thus enable it to be correctly recycled, the upper free edge of the cylindroid chamber 36 is provided with a peripheral collar 46 which can also be made from galvanized steel sheet in the form of a conversion component. Clearly, the annular bend 32 and the peripheral collar 46, made for example from galvanized steel sheet, together with the safety nets 42 and 44 and the compression grid 30, will be installed without the use of any fixing devices which might perturb the outflow of the fluid.

In the illustrated embodiment, the speeds are distributed within the cylindroid maneuvering chamber 36 as follows:
bottom part: approximately 70 m/s
median part: approximately 50 m/s
top part: near the limit lift speed of approximately 45 m/s.

It should be noted that the air speed generated in the bottom part, namely approximately 70 m/s, allows most free fall maneuvers to be carried out by experienced operators. Beyond this region, the speed decreases to the limit lift speed in the upper section of this chamber 36. The intermediate section corresponds in fact to the most widely used speed for operators with an average level of experience. This speed, of approximately 50 m/s (180 km/hr), will in particular be complied with at the top point of the platform 48 for access to the cylinder, which is located at the level numbered 48 on the attached drawing.

At this level of the cylindroid chamber, the invention has a certain number of characteristics which are not shown in greater detail, and which are intended, in particular, to allow access to the maneuvering chamber.

Thus, the cylindroid maneuvering chamber is provided with an additional comfort net 43, fixed removably to its periphery.

According to another characteristic of the invention, the wall of the median part of the cylindroid maneuvering chamber has at least one aperture opening into a closed access chamber 52 in the dome and delimiting an access platform 48, preferably having the shape of a cylindrical solid of revolution.

According to another characteristic of the invention, the upper part of the access chamber 52 has a curved connecting profile 54, with an inward concavity to promote the circulation of the air flows.

According to another characteristic of the invention, the additional comfort net 43 is positioned substantially at the level of said access platform 48.

According to another characteristic of the invention, at least one peripheral net 56 allowing the operators to remain in the air flow is stretched over said aperture in the extension of the wall of the diverging conical part 40.

According to another characteristic of the invention, two peripheral nets 56 overlap each other at least partially in order to allow the operators to access the maneuvering chamber.

According to another characteristic of the invention, the inner wall of the conical chamber 40 comprises a take-off and damping border 58 whose inner face extends in the extension of said inner wall of the conical chamber 40.

The homogeneity of the rising air flow in the cylindroid chamber 36 is also promoted by good recirculation of the air flow within the superstructure and substructure of the installation, the air flow passing through the annular chamber 20. This air circulation is indicated schematically by different arrows on the attached drawing. To promote this air circulation, the superstructure is provided with a profiled central projection in the form of a solid of revolution 50 which is centered on the axis of revolution of the cylindroid maneuvering chamber 36. Advantageously, this profiled central projection in the form of a solid of revolution 50 takes the general shape of a cone whose lateral surface is concave with a concavity directed toward the interior of said projection.

This arrangement promotes changes in the direction of the air at the outlet of the cylindroid chamber 36.

Clearly, the simulator described above can also comprise a certain number of modifications and/or additions without thereby departing from the scope of the present invention.

Thus, it is possible to provide for the presence of ventilation openings and/or devices to reduce the internal temperature of the installation.

The use of extractors to suppress noise inside and outside the installation can also be envisaged for certain conditions of use.

The use of any additional grids for diffusing and/or stabilizing the air flow can also be envisaged within the scope of certain specific applications of the simulator according to the invention.

The invention claimed is:

1. A free fall simulator, comprising:
a lower compression chamber:
a plurality of fans, wherein the fans are arranged in a centripetal configuration and the outlets of the fans open in a vicinity of a lower periphery of the chamber, and
a compression grid placed in an upper tapered part of the chamber;
a cylindrical chamber delimiting a maneuvering chamber, which is located immediately above the compression chamber, and which is designed to be traversed by a homogenous flow of rising air having a speed gradient decreasing regularly from the bottom to the top; and
a generally cylindrical superstructure which encloses at least the maneuvering chamber of the simulator, wherein the upper part of the superstructure terminates in a dome which covers said maneuvering chamber of the simulator, and which is arranged to promote a downward circulation of air leaving the maneuvering chamber toward fan inlets.

2. The simulator as claimed in claim 1, wherein an inner surface of the compression chamber is shaped to generate a homogeneous air flow to ensure stability of the operator in the maneuvering chamber.

3. The simulator as claimed in claim 1, wherein the lower compression chamber includes a bottom part with a general cylindrical shape that extends upwards into a truncated conical part.

4. The simulator as claimed in claim 3, wherein the inner wall of the truncated conical part includes an annular bend that projects towards the interior of the compression chamber, preventing separation an air stream along the inner wall of the truncated conical part.

5. The simulator as claimed in claim 3, wherein the fans open in a wall of the bottom part with a constant angular spacing.

6. The simulator as claimed in claim 1, wherein the compression grid is in the form of a grid with a mesh size of 500 mm×500 mm and is adapted to generate a pressure drop of approximately 150 Pa.

7. The simulator as claimed in claim 1, wherein an air speed at inlets of the fans is on the order of 7 m/s and an air speed at outlets of the fans is on the order of 40 m/s.

8. The simulator as claimed in claim 1, wherein the cylindrical chamber includes a generally cylindrical bottom part and a generally diverging conical part, wherein the generally cylindrical bottom part extends upwardly to the generally diverging conical part.

9. The simulator as claimed in claim 8, wherein an angle formed by the walls of the generally diverging conical part to the vertical is less than approximately 6°.

10. The simulator as claimed in claim 1, wherein the cylindrical chamber is fitted with a safety net in each of a top part and a bottom part of the cylindrical chamber.

11. The simulator as claimed in claim 10, wherein the cylindrical chamber includes an additional comfort net that is removably fixed to a periphery of the cylindrical chamber.

12. The simulator as claimed in claim 1, wherein the cylindrical chamber is adapted so that the following speeds are distributed in the cylindrical chamber:
bottom part of cylindrical chamber: approximately 70 m/s;
median part of the cylindrical chamber: approximately 50 m/s;
top part of the cylindrical chamber: near a limit lift speed of approximately 45 m/s.

* * * * *